United States Patent [19]

Okamura et al.

[11] 3,887,527
[45] June 3, 1975

[54] METHOD OF PRODUCING MALEIC ANHYDRIDE MODIFIED POLYISOPRENE RUBBER

[75] Inventors: Takayuki Okamura; Shobu Minatono, both of Kashima, Japan

[73] Assignee: Kuraray Co., Ltd., Kurashiki, Japan

[22] Filed: June 15, 1973

[21] Appl. No.: 370,380

[30] Foreign Application Priority Data
June 16, 1972 Japan................................. 47-60853

[52] U.S. Cl. ......... 260/78.4 D; 260/879; 260/41.5 R
[51] Int. Cl. ............................................. C08f 27/00
[58] Field of Search ................................ 260/78.4 D

[56] References Cited
UNITED STATES PATENTS

| | | | |
|---|---|---|---|
| 3,567,691 | 3/1971 | Van Breen et al................. | 260/78.4 |
| 3,644,248 | 2/1972 | Luijk et al..................... | 260/23.7 M |
| 3,778,418 | 12/1973 | Nakayama..................... | 260/78.4 D |

*Primary Examiner*—Joseph L. Schofer
*Assistant Examiner*—John Kight III
*Attorney, Agent, or Firm*—Bacon & Thomas

[57] ABSTRACT

High cis - 1,4-polyisoprene rubber is modified with maleic anhydride, with substantially no increase in gel content, by reacting same in the presence of an inert solvent utilizing certain specified amounts of maleic anhydride and radical-yielding catalyst in a certain specified ratio therebetween.

6 Claims, No Drawings

3,887,527

METHOD OF PRODUCING MALEIC ANHYDRIDE MODIFIED POLYISOPRENE RUBBER

FIELD OF THE INVENTION

This invention relates to a method of producing modified polyisoprene rubber exhibiting high physical strength properties, even while still in its unvulcanized stated and, more especially, relates to the modification of such rubber by reacting maleic anhydride with synthetic, high cis-1,4-polyisoprene rubber (hereinafter IR) under such conditions that there results substantially no increase in gel content of the thus modified rubber in comparison with the starting material IR.

BACKGROUND OF THE INVENTION

IR is a rubber which is widely useful and is highly versatile. IR has a chemical structure analogous to that of natural rubber and also displays splendid processability characteristics such as excellent workability on rolls, low mill shrinkage after milling and is readily extruded; further, its vulcanized products demonstrate physical properties similar to those of natural rubber. However, IR has one serious shortcoming in that it has rather poor tensile strength in the unvulcanized state, the so-called "green strength," and this is sometimes found responsible for "flagging" or deformation of the uncured stock that could take place in the calendering or molding step before vulcanization in the scheme of the manufacture of rubber articles. Another serious problem encountered with IR are the limited results attained in attempting to compound the same with a reinforcing white filler such as calcium carbonate, clay and silica. What this means is that, for example, the stress at elongation, or modulus, of a vulcanizate of IR compounded with a white filler is low and, hence, rubber products obtained therefrom are soft and flexible. In a given application of the IR, this can be a merit, while in another a demerit.

Representative of one method for improving the green strength of IR, it has been proposed to add a radical-yielding catalyst such as an organic peroxide and an azo-compound, a nitroso compound or a small amount of vulcanization accelerator and sulfur to the IR and then heat the mixture to initiate the cross-linking reaction. However, according to these methods, although the green strength of the IR is indeed increased, there is produced an objectionable gel fraction insoluble in the typical good solvents for IR such as benzene and toluene, thus giving rise to many unwieldly problems, for example, adhesion of the gel to the reactor walls during the reaction making it difficult to agitate the reaction mixture or withdraw the reaction product from the reactor. Further, modified IR obtained in this manner is greatly impaired in its processability. That is, the formation of the gel deteriorates the workability on a roll, resulting in reduced processability and increased shrinkage upon milling to seriously hinder calendering. Hence, again according to these known methods, when evaluated as a whole, and even though the green strength is indeed appreciably increased, it can be said that many of the other important properties of the IR vulcanizate are extremely adversely affected. Moreover, if the cross-linking reaction be suppressed to such extent as to restrain the formation of the gel so as not to impair the processability of the product, the cross-links then are easily broken during mastication resulting in little or no increase in green strength.

Alternatively, it has also been proposed to react the IR with maleic anhydride in a solution containing a radical-yielding catalyst to increase green strength and to gel the IR through the addition and cross-linking reactions. This method, however, exhibits the fatal defects in that scission of the IR macromolecules occurs frequently during the course of the reaction, the reaction proceeds only with great difficulty and also the processability of the product is markedly diminished due to the formation of the gel.

SUMMARY OF THE INVENTION

It has now been found, however, that the desired improvement in the properties of the IR can be achieved by employing a radical-yielding catalyst and maleic anhydride, similar to the above, but in the absence of those deleterious side effects heretofore enumerated, if the reaction conditions are very strictly controlled.

Thus, according to the present invention there is provided a method of producing modified IR by reacting maleic anhydride with high cis-1,4-polyisoprene rubber with the aid of a radical-yielding catalyst, at a temperature of between about 0° to 150°C., in the presence of an inert solvent and under an atmosphere of an inert gas, characterized in that the maleic anhydride and radical-yielding catalyst are employed, respectively, in amounts satisfying the following conditions:

A. the amount of maleic anhydride is in the range of about 0.4 to 3 parts by weight per 100 parts by weight of the rubber, B. the value obtained by multiplication according to the equation [amount of radical-yielding catalyst expressed in millimol per 100 g. of said rubber] × [initiator efficiency] is in a range of about 0.016 to 1.03, and C. the value of (A)/(B) is in the range of about 0.24 to 24.2, and the reaction is allowed to proceed until a product having a chemically bonded maleic anhydride content of about 0.03 to 0.9 mol per 100 recurring units of the isoprene monomer in the polyisoprene polymer.

The modified IR obtained by the method of the present invention has high green strength and displays excellent processability, with substantially no increase in gel content as compared with the starting material IR and with no scission in the main chains of the IR macromolecules. Further, this modified IR is readily compounded with a reinforcing amount of white filler to ultimately provide a highly reinforced vulcanizate comprising said white filler.

The term "gel" as used herein denotes a benzeneinsoluble fraction that can be filtrated with a glass filter having micropores of a size of from about 20 to 30 $\mu$.

DETAILED DESCRIPTION OF THE INVENTION

In the present invention, as above mentioned, it is important to employ the maleic anhydride and the radical-yielding catalyst in amounts within the specified range and in the specified ratio. However, these conditions do not necessarily apply to all types of polyisoprene rubber. And this is because polyisoprene rubber of course varies in its reactivity according to the cis-1,4 content thereof. For example, if the reaction is carried out under the aforesaid specified conditions and there is employed a polyisoprene with a cis-1,4 content of less than 93%, gelation or molecular chain scission is certain to occur, rendering it virtually impossible to obtain the desired modified IR. Moreover, the processability and the green strength of the thus obtained modified IR are not sufficient for practical use. The method of the present invention can be best applied to high cis-1,4-polyisoprene rubber wherein the cis-1,4 content is 95% or preferably even higher than 96%. It is well known that such high cis-1,4-polyisoprenne rubbers can conveniently be produced by solution polymerization of isoprene in the presence of a Ziegler type catalyst.

The amount of maleic anhydride employed in the present invention is within the range of from about 0.04 to 3 phr (phr: parts per 100 parts by weight of rubber) based on the amount of the starting material IR. This range for the amount of maleic anhydride utilized is one of the essential factors according to the invention for obtaining the desired product with substantially no formation of gel during the reaction. If the amount of maleic anhydride employed is less than about 0.04 phr, the bound maleic anhydride content in the IR is insufficient and hence satisfactory results cannot be attained as regards those physical properties such as green strength or compounding of the vulcanizate with a reinforcing amount of a white filler. On the other hand, if the maleic anhydride is employed in amounts in excess of 3 phr, there may take place during the reaction scission of the main IR polymer chain, oftimes with simultaneous cross-linking of the IR to result in the formation of an undesirable gel fraction. The most preferred amount of maleic anhydride to be reacted is in the range of from about 0.1 to 1.9 phr.

It is also essential according to the invention to strictly confine the amount of the radical-yielding catalyst used in the reaction, in the same sense as is the case with the maleic anhydride. In the present invention, the amount of the radical-yielding catalyst utilized is expressed by the value obtained by multiplication according to the equation: [amount of radical-yielding catalyst expressed in millimol per 100 g. of IR] × [initiator efficiency].

It is mandatory in accomplishing the various objects of this invention that the aforesaid value be within the range of from about 0.016 to 1.03, preferably from about 0.04 to 0.62. If said value exceeds 1.03, a cross-linking reaction of the IR by the radical-yielding catalyst may take place to give rise to an objectionable gel, while if said value is less than 0.016, the bound maleic anhydride content is insufficient to provide an IR with satisfactory physical properties. The term "initiator efficiency" as used herein (hereinafter $f$) is the ratio of the number of radicals with which the reaction was initiated, to the number of radicals produced by decomposition of the initiator. In the present invention, the value of such ratio is obtained by quantitative analysis of the initiator fragments bonded to the ends of the molecules of the polymer produced by solution polymerization of vinyl acetate at 70° to 100°C. using benzene as a solvent. The initiator efficiency of benzoyl peroxide, which is a typical radical-yielding catalyst, is approximately 1, and that of azobis-isobutyronitrile is approximately 0.7. Other azoic catalysts display such initiator efficiency within the range of approximately 0.6 to 0.7. In the present invention, it is possible to use any of the well known types of radical-yielding catalysts which are generally employed in the radical polymerization of vinyl compounds. Examples of such catalysts are: peroxides or hydroperoxides such as benzoyl peroxide, diisopropylperoxy-dicarbonate, cumenehydroperoxide, and the like; azoic catalysts such as 2,2'-azobisisobutyronitrile, 2,2'-azobis (4-methoxy-2,4-dimethylvaleronitrile), and the like; and redox catalysts such as hydrogen peroxide-ferrous salt, cumenehydroperoxide-amine, and the like.

But even if the maleic anhydride and the radical-yielding catalyst are employed in the aforesaid specified amounts, respectively, such is in and of itself insufficient to attain the objects of the present invention. It is therefore also essential to employ both of said materials in a specific ratio. According to the present invention, it is thus important that the value obtained by dividing the amount (phr) of maleic anhydride (A) by the value (B) of [amount of radical-yielding catalyst expressed in millimol per 100 g. of IR] × [initiator efficiency], that is to say (A)/(B), be within the range of from about 0.24 to 24.2. Otherwise, it is virtually impossible to obtain a modified IR having improved green strength without generating substantial gel during the reaction. If the value of (A)/(B) is less than 0.73, particularly if its less than 0.24, the cross-linking reaction effected among the IR macromolecules by the radical-yielding catalyst predominates to give rise to an objectionable amount of the undesirable gel. On the other hand, if said value exceeds 2.90, particularly if it exceeds 24.2, scission of the IR molecules takes place during the reaction to reduce molecular weight, and, here again, the cross-linking reaction occassioned by the maleic anhydride predominates to induce gelation. Thus, the ratio of maleic anhydride and radical-yielding catalyst in the present invention must be selected such that the value of (A)/(B) is within the range of from about 0.73 to 2.90, preferably from about 1.2 to 2.4.

In order to more clearly characterize the above relationships, the results of various reactions conducted employing the maleic anhydride and the radical-yielding catalyst in varying amounts are set forth in Table 1.

Table 1

| (BPO) (millimol per 100 g of IR) | (MAn) (phr) | (MAn) (BPO)xf | Gel content (%) | $\eta$ (dl/g) | Mooney viscosity $ML_{1+4}$ 100°C | Bound MAn content (mol/isoprene monomer unit 100) |
|---|---|---|---|---|---|---|
| 0.41 | 1.0 | 2.4 | none | 4.0 | 85 | 0.3 |
| 0.47 | 0.7 | 1.4 | none | 4.2 | 87 | 0.2 |
| 0.41 | 0.5 | 1.2 | none | 4.3 | 92 | 0.1 |
| 0.017 | 0.04 | 2.4 | none | 4.3 | 92 | 0.03 |
| 1.24 | 0.27 | 0.22 | 45 | 4.5 | 150 | 0.025 |
| 1.03 | 0.2 | 0.19 | 53 | 4.6 | 160 | 0.02 |

Table 1—Continued

| (BPO) (millimol per 100 g of IR) | (MAn) (phr) | (MAn) (BPO)xf | Gel content (%) | $\eta$ (dl/g) | Mooney viscosity $ML_{1-4}$ 100°C | Bound MAn content (mol/isoprene monomer unit 100) |
| --- | --- | --- | --- | --- | --- | --- |
| 0.083 | 5.0 | 60.6 | 30 | 1.5 | 105 | 2.0 |
| 0.041 | 3.1 | 75.1 | 25 | 1.7 | 102 | 1.5 |

Starting IR: gel content 2%, Mooney viscosity $ML_{1-4}$, 100°C. 80, $[\eta]$ 4 dl/g.
BPO : benzoylperoxide
MAn : maleic anhydride
$[\eta]$ : intrinsic viscosity in toluene at 30°C.
Reaction conditions: xylene solution at 100°C. for 3 hours in the atmosphere of nitrogen
: determined by alkali titration for toluene dissolved portion.

As is clearly apparent from the Table 1, it is possible to obtain a modified IR with substantially no gel formation and substantially no reduction in molecular weight by employing the radical-yielding catalyst and the maleic anhydride in the above specified amounts and in the above specified ratio.

In the present invention, it is essentially necessary that the maleic anhydride - IR adduct be produced in the manner described and that the thus obtained modified IR should contain bound maleic anhydride in an amount of from about 0.03 to 0.9 mols per 100 recurring units of isoprene monomer in the polyisoprene polymer. If the bound maleic anhydride content is less than 0.03 mol, the green strength and the modulus of a filler reinforced vulcanizate (expressed as stress at 300% elongation) suffer. Contrariwise, if the bound maleic anhydride content is higher than 0.9 mol, it is often impossible to obtain the desired gel-free product.

Also, the green strength and the stress at 300% elongation of a vulcanizate containing a reinforcing amount of a white filler become excessively high, and workability on a roll, as well as other processing properties, are markedly deteriorated. Therefore, if the modified IR of the present invention does not contain the bound maleic anhydride in an amount of from about 0.03 to 0.9 mol per 100 isoprene monomer recurring units, even though the green strength of the thus obtained unvulcanized rubber is high, deterioration of many other properties inevitably results, so that when evaluated on the whole, the resultant product is not a "high utility" rubber useful for a variety of purposes. Fortunately, in the present invention, if the reaction is conducted under the foregoing conditions of closely specified amounts and in the specified ratio of maleic anhydride to radical-yielding catalyst until the reaction is essentially complete, there can be obtained in most instances an IR product having a bound maleic anhydride content of 0.03 to 0.9 mol per 100 recurring units of isoprene monomer. Therefore, in the instance where it is not necessary that the content of bound maleic anhydride in the modified IR be stringently monitored, the reaction may be continued to a stage whereat the reaction virtually comes to a stop. There is a certain interrelationship between the bound maleic anhydride content in the IR and reaction time. Therefore, if such relation between the bound maleic anhydride content and the reaction time under certain specified reaction conditions has been previously determined by a simple preliminary experiment, it is possible to optionally change the bound maleic anhydride content within the range of 0.03 to 0.9 mol/(100 of isoprene monomer unit) by simply controlling the reaction time in the actual running of the reactions. It is generally desirable to adjust the content of the bound maleic anhydride by this method. The reaction time, although same varies somewhat depending upon temperature, amount of radical-yielding catalyst and maleic anhydride employed, and like factors, typically ranges from 0.5 to 4 hours. To stop the reaction, there can be utilized any of the typical and ordinary methods for terminating a radical reaction such as by adding a radical polymerization inhibitor, lowering the reaction temperature, or placing the reaction mixture into a medium which is not a solvent for the product. According to the present invention, the bound maleic anhydride content is easily determined by dissolving the reaction product in benzene and then titrating the mixture with a solution of sodium hydroxide in an ethanol-benzene mixed solvent (in a ratio of 1:4 by volume) using, as an indicator, bromthymol blue or phenolphthalein.

The relationship between bound maleic anhydride content and green strength, and the relationship between bound maleic anhydride content and stress at 300% elongation (of a vulcanizate containing calcium carbonate) are reflected in Table 2.

Table 2

| BPO (millimol per 100 gr. IR) | MAn (phr) | Bound MAn content (mol/isoprene unit 100) | Banding on roll (min.)5) | Stress at 100% elongation (kg./cm.²)1) | Green strength Stress at 300% elongation kg./cm.²)1) | Creep (elongation after 30 minutes) (cm.)2) | Physical 3) properties of vulcanizate Stress at 300% elongation (kg./cm.²) |
| --- | --- | --- | --- | --- | --- | --- | --- |
| — | — | 0 | 1:0 | 1.0 | 0.8 | 6.6 | 23 |
| 0.21 | 0.03 | 0.015 | 1.1 | 1.1 | 0.9 | 6.5 | 24 |
| 0.083 | 0.1 | 0.0 | 1.1 | 1.4 | 1.6 | 4.6 | 40 |
| 0.21 | 0.2 | 0.1 | 1.2 | 1.6 | 1.9 | 4.5 | 40 |
| 0.41 | 1 | 0.3 | 1.3 | 1.7 | 2.2 | 4.2 | 43 |
| 0.62 | 1.5 | 0.5 | 1.5 | 1.9 | 2.6 | 4.2 | 45 |
| 0.041 | 2.6 | 1.0 | 4 | 4.3 | 12.6 | 4.1 | 65 |

Table 2—Continued

| BPO (millimol per 100 gr. IR) | MAn (phr) | Bound MAn content (mol/isoprene unit 100) | Banding on roll (min.)5) | Stress at 100% elongation (kg./cm.²)1) | Green strength Stress at 300% elongation kg./cm.²)1) | Creep (elongation after 30 minutes) (cm.) 2) | Physical 3) properties of vulcanizate Stress at 300% elongation (kg./cm.²) |
|---|---|---|---|---|---|---|---|
| 0.041 | 3.1 | 1.5 | 6 | 5.2 | 18.7 | 4.1 | 78 |

Starting
Material IR: cis-1,4 content 98%, intrinstic viscosity 3.52
dl./g. (in toluene at 30°C.), produced by using
a Ziegler type catalyst.
1) : 30°C., tension speed 2 cm./min.
2) : initial length 4 cm., 250 g./cm.², 25°C.
3) : Composition (parts by weight) rubber 100 parts,
accelerator (dibenzothiazyl disulfide) 1.0 part,
accelerator (diorthotolyl guanidine) 0.3 part,
sulfur 3 parts, zinc oxide 5 parts, stearic
acid 3 parts, precipitated calcium carbonate 5
parts, and antioxidant (2,2'-methylene-bis
(4-methyl-6-tert.-butyl phenol) 1 part.
4) : 25°C., tension speed 50 cm./min.
5) : time from feeding of rubber onto rolls until
formation of a smooth band; 8-inch rolls, 55°C.,
20/22 r.p.m.

As is apparent from said Table 2, the green strength of the IR and the stress at 300% elongation of a calcium carbonate reinforced vulcanizate are greatly improved by introducing more than 0.03 mol/(100 isoprene monomer units) of maleic anhydride into the IR, but if the amount of maleic anhydride added exceeds 0.9 mol/(100 isoprene monomer units), the stress at elongation of the vulcanizate is over extended. It is also noted that IR containing such excess amount of maleic anhydride tends to be markedly deteriorated in processability such as roll banding, shrinkage after milling, and extrudability.

In the method of the present invention wherein maleic anhydride is reacted with IR in the presence of a radical-yielding catalyst, a solvent for the IR is used as a reaction medium for effecting uniform dispersion of the maleic anhydride and catalyst in the IR and also for facilitating control of the bound maleic anhydride content. Preferred solvents are the aromatic solvents and the saturated aliphatic hydrocarbon solvents which readily dissolve IR and which are inert to the reaction, such as, for example, benzene, toluene, xylene, n-hexane, n-heptane, butane, isopentane, and the like, which, if necessary, may be employed under positive pressure. These hydrocarbons may be used either singly or in admixture and there may also be added thereto a small amount of non-solvent, for example, ketones such as acetone, or saturated aliphatic alcohols such as methanol. Halogenated hydrocarbons, unsaturated aliphatic hydrocarbons and solvents containing such hydrocarbons are unsuited for use as a reaction solvent in the present invention, because such halogenated hydrocarbons impede the addition reaction of the maleic anhydride to the IR; while unsaturated aliphatic hydrocarbons are prone to be homopolymerized or to copolymerize with the maleic anhydride. Such polymers are patently unnecessary for modification of the IR. Rather, they may even adversely affect the properties of the rubber by increasing permanent set, reducing tear resistance and accelerating dynamic fatigue of the vulcanized rubber. If the IR concentration in the solution is as high as 20% or more, it becomes difficult to perform stirring and to handle the solution subsequent to the reaction by reason of the increased viscosity of the reaction solution, and, also, a gel is often formed during the reaction. Therefore, the concentration of the IR in the IR solution during reaction should be maintained within the range of from about 0.1 to 15%, preferably from about 1 to 10%.

The reaction temperature, which may be varied somewhat depending upon the type of radical-yielding catalyst employed, typically is in the range of from about 0° to 150°C., preferably from about 20° to 100°C. This temperature range permits the reaction to be conducted without concomitant noticeable reduction in molecular weight of the IR. If the reaction is carried out in the presence of oxygen, for example, in the presence of air, scission of the IR polymer or disintegration of the peroxide initiator may take place to effect a reduction in the content of the bound maleic anhydride. Therefore, the reaction is advantageously conducted in atmosphere of an inert gas, such as nitrogen gas.

In the method of the present invention, it is permitted to add to the reaction system a third material, which does not adversely affect the reaction, but in this respect it should be noted that addition of an antioxidant thereto may diminish reaction efficiency, such that it is impossible to obtain 0.03 to 0.9 mol (100 isoprene monomer units) of bound maleic anhydride under the conditions of the present invention.

It is indeed surprising that a modified IR obtained according to the method of the present invention exhibits improved green strength notwithstanding the facts that substantially no increase in gel content is observed as compared with the starting material IR and also that the content of bound maleic anhydride is quite small.

The IR-maleic anhydride adducts according to the present invention show no noticeable reduction in green strength due to mastication, which is often the case in an IR containing a gel produced by crosslinking. Also, as is apparent from Table 1, the modified IR according to the invention is substantially free from gel and has a relatively low Mooney viscosity, and, hence, is almost as readily processable as the starting material IR in, for example, those respects of roll processability, calendering and extrudability. Thus, according to the invention, a modified IR having such excellent properties can be produced without substantial gel formation during reaction. There is consequently encountered no problem of gel adhesion to the reactor walls and, additionally, no difficulties are encountered in transportation of the reaction mixture and coagulation of polymers.

In order to further illustrate the present invention and the advantages thereof, the following specific examples are given, it being understood that same are intended only as illustrative and in no wise limitative.

EXAMPLE 1

High cis-1,4-polyisoprene having a cis-1,4 content of 98%, an intrinsic viscosity ($\eta$) of 3.52 dl./g. as measured in toluene at 30°C., and an insoluble fraction of 2% in benzene when filtered with a glass filter having micropore sizes of from 20 to 30 $\mu$, was produced by the solution polymerization of isoprene in the presence of a Ziegler type catalyst, and was used herein as the starting material IR.

200 gr. of this starting material IR was dissolved in 6,000 ml. of xylene, and the resulting solution was placed in a suitable reactor and there was further added thereto 1.2 phr of maleic anhydride and 0.25 gr. (0.516 millimol per 100 gr. of IR) of benzoyl peroxide. The mixture was next heated at 100°C. for three hours under a nitrogen atmosphere ([MAn]/[BPO] $\times f$ = 2.33). Then the reaction solution was placed into a bulk amount of acetone to precipitate the polymers, and the unreacted maleic anhydride was removed.

The thus obtained maleic anhydride - IR adduct was dissolved in benzene and titrated with a solution of sodium hydroxide in a methanol-benzene mixed solvent. It was determined that the bound maleic anhydride content was 0.37 mol/(100 isoprene monomer units) and the intrinsic viscosity (in toluene at 30°C.) was 3.6 dl./g. No reduction in molecular weight of the IR was observed during the course of the reaction. In the maleic anhydride-IR adduct, there was a 2% benzene insoluble fraction (via filtration with a glass filter having a micropore size of 20 to 30 $\mu$) which reflected no increase in gel content.

Said maleic anhydride - IR adduct was then pressed into a sheet and its green strength was measured. The results of this test are shown in Table 3 in comparison with the starting material IR.

Table 3

|  | Green strength | | |
| --- | --- | --- | --- |
|  | Stress at 100% elongation (kg./cm.²)1) | Stress at 300% elongation (kg./cm²)1) | Creep (elongation after 30 mins. (cm.)2) |
| Maleic anhydride - IR adduct | 1.8 | 2.4 | 4.2 |
| Starting IR | 1.0 | 0.8 | 6.6 |

1):Instron tester, 2 cm./min., 30°C.
2):Initial length 4 cm., load 250 g./cm.², 25°C.

EXAMPLE 2

A maleic anhydride - IR adduct was prepared in the same manner as in Example 1, except that isopentane was used instead of xylene, and diisopropylperoxydicarbonate (0.516 millimol per 100 gr IR) was used in place of the benzoylperoxide ([MAn] / [catalyst] $\times f$ = 2.33).

The bound maleic anhydride content in the adduct produced was 0.28 mol/(100 isoprene monomer units) and no gel increase was observed throughout the reaction. By way of comparison, the amount of maleic anhydride used employed in the above reaction was increased from 1.25 phr to 5 phr and the reaction was duplicated. The results obtained evidenced that the benzene insoluble gel in the maleic anhydride - IR adduct was 62% and the bound maleic anhydride content 2.5 mol/(100 isoprene monomer units). These two types of rubber were then subjected to mastication and milling by using 8-inch diameter rolls with a roll surface temperature of 55°C., a revolutionary speed ratio of front to rear rolls of 20/22 rpm and having a nip therebetween of 0.4 mm. To form a smooth band on the roll, only one minute was required when using the maleic anhydride - IR adduct prepared according to the present invention, but as long as 7 minutes were required when using the comparative maleic anhydride - IR adduct containing the gel fraction produced during the course of the action. Thus, the gel-free modified IR according to the present invention exhibited very excellent processability on rolls.

EXAMPLE 3

This reaction was carried out exactly as in Example 1, except that the maleic anhydride was used in an amount of 0.6 phr and the benzoyl-peroxide in an amount of 0.289 millimol per 100 gr IR ([MAn] / [BPO] $\times f$ = 2.08) to produce a maleic anhydride - IR adduct. No increase in gel content was observed during the reaction.

The bound maleic anhydride content in the thus obtained modified IR was 0.22 mol/(100 isoprene monomer units), and its green strength was markedly improved over that of the starting material IR, as shown in the Table 4.

Table 4

|  | Stress at 100% elongation (kg./cm.²) | Green strength Stress at 300% elongation (kg./cm.²) | Creep (elongation after 30 minutes (cm.) |
| --- | --- | --- | --- |
| Maleic anhydride - IR adduct | 1.7 | 2.0 | 4.3 |
| Starting IR | 1.0 | 0.8 | 6.6 |

EXAMPLE 4

Example 1, except for use of n-hexane in place of xylene and the reaction temperature was 80°C., was repeated to obtain an IR with a bound maleic anhydride content of 0.25 mol/(100 isoprene monomer units). No gelation took place during the reaction.

The thus obtained maleic anhydride - IR adduct was subjected to mastication for two minutes with 6-inch rolls under the conditions of 0.2 mm.nip and 20/22 rpm. After mastication, the green strength of the product was measured by the same method as used in Example 1. The results are shown in Table 5 in comparison with results obtained by masticating the starting material IR under the same conditions.

Table 5

|  | Stress at 100% elongation (kg./cm.²) | Green strength Stress at 300% elongation (kg./cm.²) | Creep (elongation after 30 minutes) (cm.) |
| --- | --- | --- | --- |
| Maleic anhydride- IR adduct | 1.1 | 1.5 | 5.0 |
| Starting IR | 0.4 | 0.3 | 12 |

It will be appreciated from the above Table 5 and Table 3 that the maleic anhydride - IR adduct according to the present invention is greatly improved in its green strength as compared with the starting material IR, and also that lowering of such strength due to mastication is minimized.

EXAMPLE 5

The procedure of Example 1 was again repeated, except that isopentane was employed in place of xylene, 0.516 millimol (per 100 gr. IR) of 2,2'-azobis (4-methoxy-2,4-dimethylvaleronitrile) in place of benzoyl-peroxide ([MAn] / [catalyst] $\times f = 2.33$) and a reaction temperature of 40°C. was utilized.

The bound maleic anhydride content in the thus obtained modified IR was 0.34 mol/(100 isoprene monomer units) and no increase in gel content occurred. The green strength measured was substantially equal to that of the maleic anhydride - IR adduct obtained in Example 1.

A vulcanizate of said modified IR was prepared utilizing the compounding recipe and the vulcanizing conditions shown in the Note to Table 2. Said vulcanizate exhibited a stress at 300% elongation of 44 kg./cm.$^2$. By way of comparison, a vulcanizate was also prepared under the same condition except that the starting material IR was used instead. Stress at 300% elongation of said vulcanizate was only 23 kg./cm.$^2$.

While the invention has been described and illustrated with reference to certain preferred embodiments thereof, those skilled in the art will appreciate that various modifications, changes, omissions, and substitutions can be made without departing from the spirit of the invention. It is intended, therefore, that the invention be limited only by the scope of the claims which follow.

What is claimed is:

1. A method of producing modified polyisoprene rubber, comprising reacting maleic anhydride with a high cis-1,4-polyisoprene rubber having a cis-1,4 content of at least 95% by means of a radical-yielding catalyst, at a temperature of from about 0° to 150°C., in an inert solvent for said rubber as a reaction medium and under an atmosphere of an inert gas, characterized in that the maleic anhydride and the catalyst are respectively employed in amounts satisfying the conditions:

A. the amount of maleic anhydride is in the range of about 0.04 to 3 parts by weight per 100 parts by weight of the said rubber;

B. the value [amount of radical-yielding catalyst expressed in millimol per 100 g. of said rubber] × [initiator efficiency] is in the range of about 0.016 to 1.03; and C. the value (A)/(B) is in the range of about 0.24 to 24.2 and conducting the reaction until a product having a bound maleic anhydride content of from about 0.03 to 0.9 mol per 100 recurring units of isoprene monomer in the polyisoprene polymer is obtained.

2. The method as defined by claim 1, wherein the amount of maleic anhydride employed is in the range of about 0.1 to 1.9 parts by weight per 100 parts by weight of the polyisoprene rubber.

3. The method as defined by claim 1, wherein the value [amount of radical-yielding catalyst expressed in millimol per 100 g. of said rubber] × [initiator efficiency] is in the range of about 0.04 to 0.62.

4. The method as defined by claim 1, wherein the amount of maleic anhydride employed is in the range of about 0.04 to 3 parts by weight per 100 parts by weight of the polyisoprene rubber.

5. The method as defined by claim 1, wherein the value (A)/(B) is in the range of about 0.73 to 2.90.

6. The method as defined by claim 6, wherein said value is in the range of about 1.2 to 2.4.

* * * * *